United States Patent
Phillips

[15] 3,693,824
[45] Sept. 26, 1972

[54] BAKERY PAN
[72] Inventor: Charles E. Phillips, Cincinnati, Ohio
[73] Assignee: Lockwood Manufacturing Company, Cincinnati, Ohio
[22] Filed: Aug. 5, 1970
[21] Appl. No.: 61,346

[52] U.S. Cl..........220/23.2, 113/120 G, 220/DIG. 29
[51] Int. Cl. ............................................B65d 21/02
[58] Field of Search................220/20, 23.2, DIG. 29; 113/120 G, 120 U, 120 CC, 121 P

[56] References Cited
UNITED STATES PATENTS

| 312,189 | 2/1885 | Chaumont.................220/23.2 |
| 3,332,571 | 7/1967 | Leedy......................220/23.2 |
| 1,553,617 | 8/1925 | Katzinger........113/120 G UX |
| 2,145,937 | 2/1939 | Lockwood..........220/DIG. 29 |

*Primary Examiner*—George E. Lowrance
*Attorney*—Wood, Herron & Evans

[57] ABSTRACT

A bakery pan comprising a series of cups drawn from rectangular sheet metal plates. The lateral edges of each plate are bent downwardly at right angles to the plane of the plate to provide welding and reinforcing edge flanges, which flanges are vertically spot welded to flanges of adjacent plates to form a pan from a matrix or array of plates. The resulting pan or array of cups are reinforced in the plane of the plate (horizontally) by the abutting vertical flanges of the plates, only small portions of which are consumed by the spot welds.

3 Claims, 6 Drawing Figures

PATENTED SEP 26 1972 3,693,824

INVENTOR.
Charles E. Phillips
BY
Wood, Herron & Evans
ATTORNEYS

INVENTOR.
Charles E. Phillips
BY
Wood, Herron & Evans
ATTORNEYS

BAKERY PAN

This invention relates to bakery pans and more particularly to reuseable bakery pans of the type commonly employed in commercial bakeries. Reuseable bakery pans are generally made from tin coated sheet steel although there has recently been a move toward increased use of aluminum baking pans. This invention is applicable to both types of bakery pans.

Bakery pans of the type to which this invention is applicable are generally made from a plurality of individual cups fastened together to form a matrix or array of cups. The array is subsequently reinforced by a surrounding metal band or wrapping strap which serves to reinforce the pan. Conventionally, the individual cups have been either secured together by crimping the top edges of the cups together or by crimping the top edges of the cups into a matrix of holes in a sheet metal plate. More recently, some pans have been made by welding together the side walls of the individual cups. A welded pan of this type is shown in U.S. Pat. No. 3,332,571 to E. H. Leedy and assigned to the assignee of this application. The pan disclosed in this patent effects the most optimal utilization of bakery oven space by placing adjacent cups as close together as possible, i.e., in side-by-side relationship. However, some bakeries prefer that the cups be spaced apart for the baking of particular sizes and styles of rolls. Consequently, side-to-side cup welded pans of the type disclosed in this patent are not suitable for all applications. To provide spacing between adjacent cups, horizontal flanges are formed on the top of the individual cups and the flanges are then secured together by either crimping or welding. When such pans have been welded it has heretofore been the practice to either butt weld adjacent plates from which the individual cups have been drawn or to form a vertical flange along the edge of each plate and then seam weld the juxtapositioned flanges. Another approach has been to form small vertical protrusions on the sides of each plate and to then spot weld those protrusions by an arc welding technique. The seam weld and the protrusion weld both result in the flange or protrusion being consumed by the weld so that the bottom of the pan in the plane of the weld or seam is continuous or flat in a horizontal plane.

This smooth bottom structure has disadvantage over the older crimped plate construction in that it is less rigid in a vertical plane. Vertical rigidity is critical to the life of a bakery pan because bakery goods are commonly extracted from pans by grabbing one edge of the pan, turning the pan upside down, and banging the opposite edge against a table or conveyor, lack of rigidity of the pan in a vertical plane allows the pan to bend when emptied in this fashion with the result that the pan becomes distorted, and broken. It has therefore been an objective of this invention to provide a bakery pan in which the individual cups are drawn from rectangular plates, the edges of which are welded together but which has the same or greater rigidity than the same style of pan but with the edges crimped together.

Another objective of this invention has been to provide a welded style of bakery pan in which the center distance of the individual cups may be varied such that the vertical sides of adjacent cups may be located very nearly in side-by-side relationship or may be spaced apart a substantial distance. One characteristic of the reuseable bakery pan business is that very nearly every commercial bakery specifies its own shape and style of pan. The result is that each manufacturer of bakery pans must provide an infinite variety of sizes and spacing of individual cups in a single style of pan. It has therefore been an objective of this invention to provide a pan construction which permits a very large range of spacing of the cups from very close to very wide.

These objectives have been accomplished and this invention is primarily predicated upon the concept of drawing individual cups from rectangular or polygonal shaped sheet metal plates. The lateral edges of each plate are bent downwardly at right angles to the plane of the plate to provide welding and reinforcing edge flanges. These flanges are then vertically spot welded by an arc welding technique to flanges of adjacent plates to form a pan from a matrix or array of plates. The resulting pan or array of cups are reinforced against vertical deflection by the abutting vertical flanges of the plates, only small portions of which are consumed by the arc welds. In other words, after assembly by this vertical spot welding technique, the major portion of the flanges remain intact in a vertical plane to provide reinforcement against vertical deflection.

This construction has the advantage that it may be welded from either the top or the bottom by a single weld rod using conventional arc welding tecnhiques. The weld rod placement is not critical so long as the rod is located opposite the flange. The rod may be located anywhere along the length of the flange and on either the top or bottom of it. Since the weld may be located on top of the pan from which the flange is bent downwardly, and need not move between adjacent cups, the cups may be spaced very close together or practically in side-by-side relationship.

These and other objectives and advantages of this invention will be more readily apparent from the following description of the drawings in which.

Figure 4:
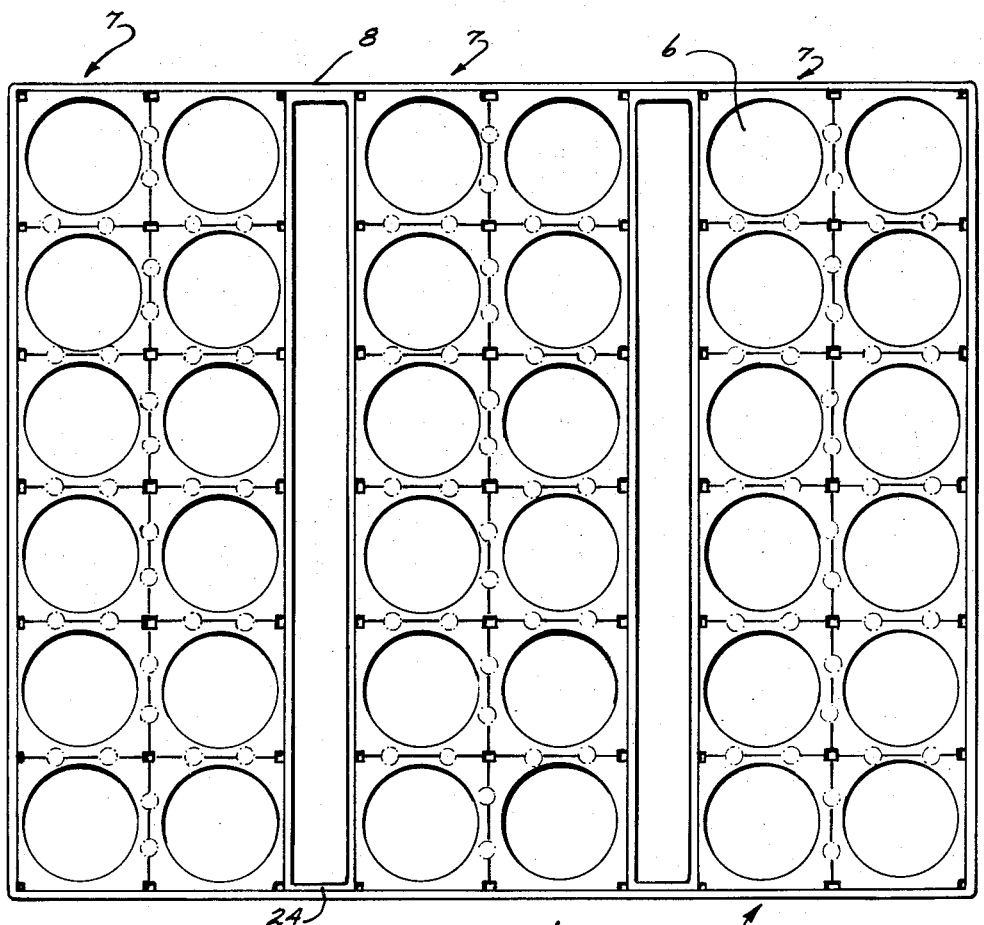
FIG. 4 is a top plan view of three different arrays of plates strapped and welded together to form a completed pan.

Referring first to FIG. 4, there is illustrated a top plan view of a bakery pan 5 incorporating the invention of this application. This pan 5 consists of a plurality of individual bakery pan cups 6 drawn from metal plates 10 which are secured together to form arrays or matrices 7 of cups. In FIG. 4 there are three such arrays or matrices secured together in spaced apart relation and enclosed by metal strapping 8 to form a completed bakery pan 5.

Figure 1:
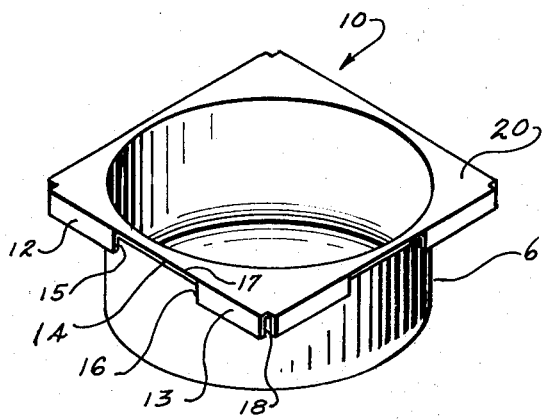
FIG. 1 is a top perspective view of a single formed plate from which a bakery cup has been drawn.
Figure 2:
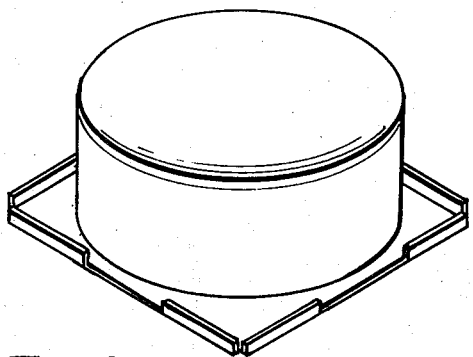
FIG. 2 is a bottom perspective view of the plate of FIG. 1.

The individual plates 10 are made up into an array 7 of cups to form a subassembly of the pan as depicted in FIGS. 1 and 2. Referring now to those figures, it will be seen that to form a completed cup 6 from a plate 10, the cup 6 is drawn downwardly from the horizontal plane of the sheet metal plate 10. This sheet metal plate is customarily either aluminum or tin plated steel. After the cup 6 is drawn from the plate, the edges of the plate are trimmed into a generally square configuration and the lateral edges are bent downwardly to form vertical flanges 12 and 13 along each edge of the square. Between the two flanges 12 and 13 there is a recess 14 defined by vertical edges 15 and 16 of the flanges 12 and 13 and a horizontal edge 17 of the plate 10. The recess 14 in each flange enables adjacent cups to be spaced very closely together.

All four sides of the square plate 10 have identical flanges bent downwardly from their lateral edges into a vertical plane. Each edge also has a recess 14 defined in the vertical flange. Consequently, when assembled, the cups may be placed in side-by-side juxtaposition without any attention to which side of a cup abuts against a side of an adjacent cup or plate.

At each corner each plate has a square recess 18 cut or trimmed from the flanges and from the horizontal plane of the plate. This notching or recessing of the corner of each plate 10 enables the plates to be placed in juxtaposition without any interference at the corners.

The completely shaped plate 10 comprises a top horizontal surface 20 which is generally square in configuration. A circular cup 6 is drawn from this surface 20. At each edge the plate has downwardly bent flanges 12 and 13 which may or may not be notched or recessed as indicated at 14. The desirability of the notch or recess is primarily dependent upon the spacing of the cups in the completed pan.

In one preferred embodiment, the cup is circular in horizontal cross-sectional configuration and has vertical walls. In other applications though, the cup is square in configuration and has tapered walls. The shape of the cup is of no consequence and forms no part of the invention of this application.

To assemble a plurality of plates 10 into an array or matrix of cups the individual plates are placed into a fixture which locates the vertical flanges 12 and 13 of each plate in juxtaposition to the vertical flanges of at least two other plates. The vertical flanges are then spot welded vertically as indicated by the dashed circular lines 21 in FIGS. 3 and 4. The resulting welds 22 are spaced along the length of the flanges with the result that only a minor portion of the vertical flanges 12 and 13 are consumed by the welds. The result is that a major portion of the length of each flange, i.e. over 50 percent, remains intact as a vertical reinforcement of the pan.

The welds 22 are so-called TIG or MIG welds, these are arc welds as opposed to electrical resistance welds (TIG is an abbreviation for Tungsten Inert Gas and MIG is an abbreviation for Metallic Inert Gas). Consequently, the welds may be made by a weld rod located on only one side of the flange. In practice, the rod is preferably located on top of the pan above the horizontal plane of the top surface 20. When so located, i.e. above the flanges rather then beneath them, the weld rods do not have to enter between adjacent cups 6 and the cups may therefore be spaced very closely together. It is to be noted that since the weld rod may be located anywhere over the length of the flange, its location and the duration of the weld are not particularly critical since there is excess metal available to make the weld and it extends over a very substantial length of the seam between plates or cups. In the preferred embodiment, there are two welds 22 along each side of juxtapositioned plates or cups.

When the array or matrix is completely assembled and all individual plates or cups are welded to at least two other plates or cups, a substantial portion or length of the flanges 12 and 13 of each plate remains intact or remains unconsumed by the weld. This is illustrated most clearly in FIG. 3 where there is shown a bottom plan view of an assembled and welded array or matrix of cups. As illustrated in that figure, the arc weldments consume only a minor portion of each flange so that there is a substantial portion of flange remaining to reinforce or rigidify the array of cups in the horizontal plane of the cups. Consequently, they are more rigid than would be the case if the complete flange were consumed by the weld as is conventional in so-called "-seam" or resistance welding. Because of the existence of the flanges in the completed pan, it better withstands manual or mechanical dumping such as occurs when a machine operator picks up the pan along one edge, turns it upside down, and bounces the other side off of a table or conveyor. The flanged pan which results from the practice of this invention is more rigid in a vertical plane and has a longer life in use than would the same pan with the flanges consumed by a seam weld.

Figure 3:
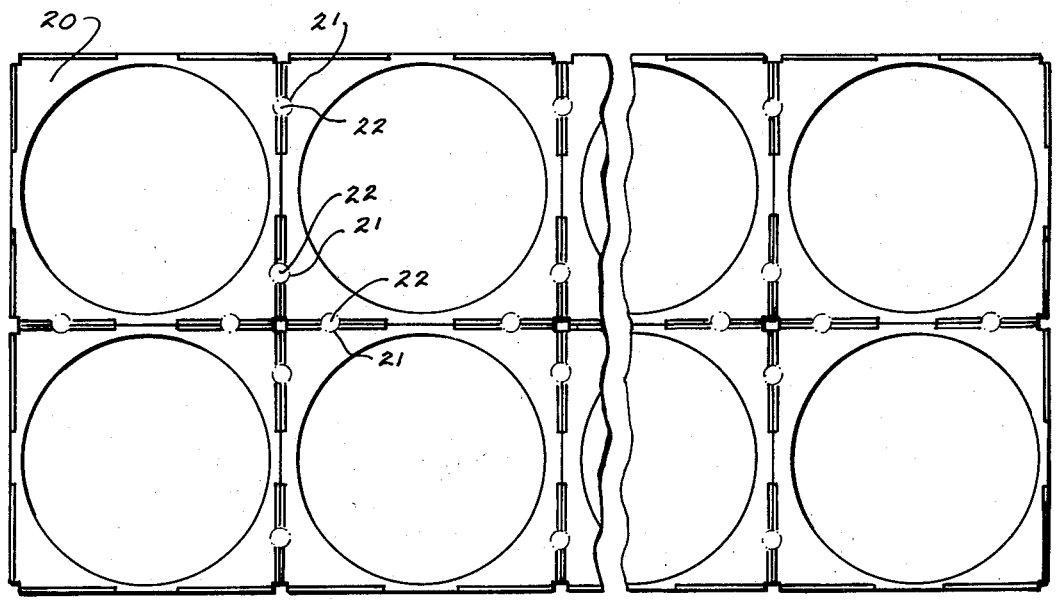
FIG. 3 is a bottom plan view of a welded array of plates from each one of which a cup has been drawn.
Figure 5:
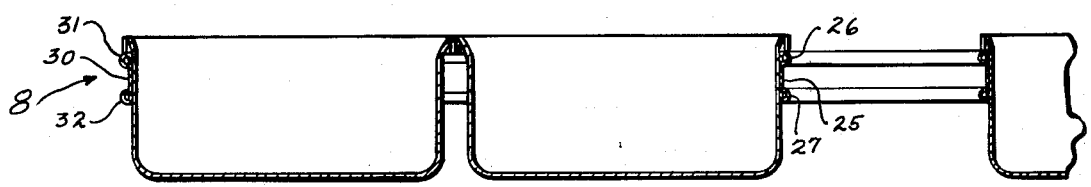
FIG. 5 is a cross-sectional view taken along line 5—5 of FIG. 4.

Referring now to FIGS. 4 and 5 it will be seen that the array of assembled cups illustrated in FIG. 3 is formed into a completed pan 5 by welding metal strapping 8 around the exterior of the array of cups 7. In the preferred embodiment illustrated in FIG. 4, three arrays 7 or matrices of cups are secured together in spaced apart relationship by welding strapping or band iron 24 formed into a generally rectangular configuration between two adjacent matrices 7 of cups. This strapping 24 generally consists of zinc or tin plated steel having a web 25 which is doubled or bent over to form loops 26 and 27 along its top and bottom edges.

After the spacing straps 24 are secured between adjacent matrices 7 of cups the rectangular frame 8 of metal strapping is secured around the exterior or periphery of the assembly. The strapping 8 also consists of a vertical web 30 having loops 31 and 32 bent outwardly along its top and bottom edges. The strapping 8 may be welded directly to the side walls of the cups, as illustrated in FIG. 5, or it may be welded to the vertical flanges 12 and 13 of the outermost cups in the assembly.

Figure 6:
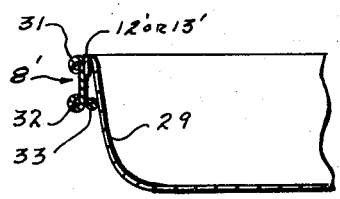
FIG. 6 is a cross-sectional view similar to FIG. 5 but of a modified pan made according to this invention.

The strapping 8' would nearly always be welded to the flanges 12', 13' or the cups rather than to the side walls 29' in the case of tapered cups. This latter construction is depicted in FIG. 6 where a spacer wire 33 is located between the lower sides of the strapping 8' and the side wall 29 of the tapered wall cups.

While I have illustrated only two embodiments of the invention of this application, those persons skilled in the arts to which this invention is applicable will readily appreciate numerous changes and modifications which may be made without departing from the spirit of my invention. Therefore, I do not intend to be limited except by the scope of the appended claims.

Having described my invention, I claim:

1. A bakery pan comprising a plurality of generally square metal plates, each of said plates being located in a generally horizontal plane and having a cup deformed downwardly out of the plane of the plates such that there remains a top horizontal surface section located in said horizontal plane, each of said plates having each lateral side wall edge bent downwardly into a vertical plane to form vertical flanges, said vertical flanges of adjacent plates being juxtapositioned and welded together by at least two flange consuming weldments along each of said juxtapositioned edges so that said weldments function as the only interconnection holding flanges of adjacent plates in juxtaposition, said two weldments being located adjacent opposite ends of each of said juxtapositioned side walls, said weldments consuming a minor portion only of each of said flanges so that a major portion of each flange remains intact normal to said plane of said plate after welding to reinforce the pan against vertical deflection.

2. The bakery pan of claim 1 wherein each of said plates is rectangular in configuration when viewed from the top and has a reinforcing metal strip surrounding and welded to the outer periphery of a plurality of assembled plates.

3. The bakery pan of claim 2, wherein the reinforcing metal strip is welded to vertical flanges on the outer periphery of the assembled plates.

* * * * *